March 4, 1969 — F. E. ROSS — 3,430,871
CONTROL FOR WASTE DISPOSER APPARATUS
Filed Dec. 27, 1966 — Sheet 1 of 3
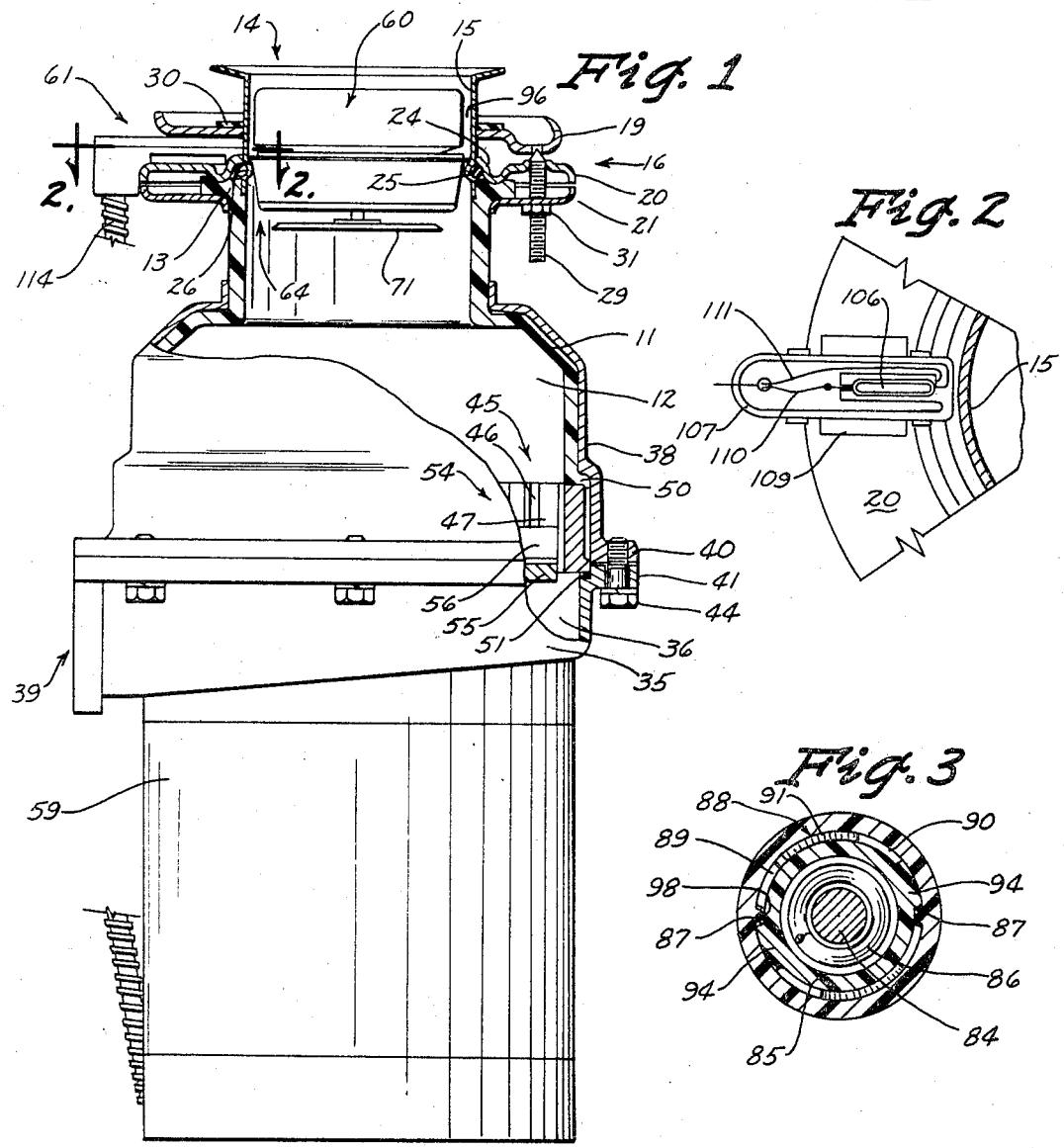
INVENTOR.
FRANK E. ROSS
BY William G. Landwier
AGENT

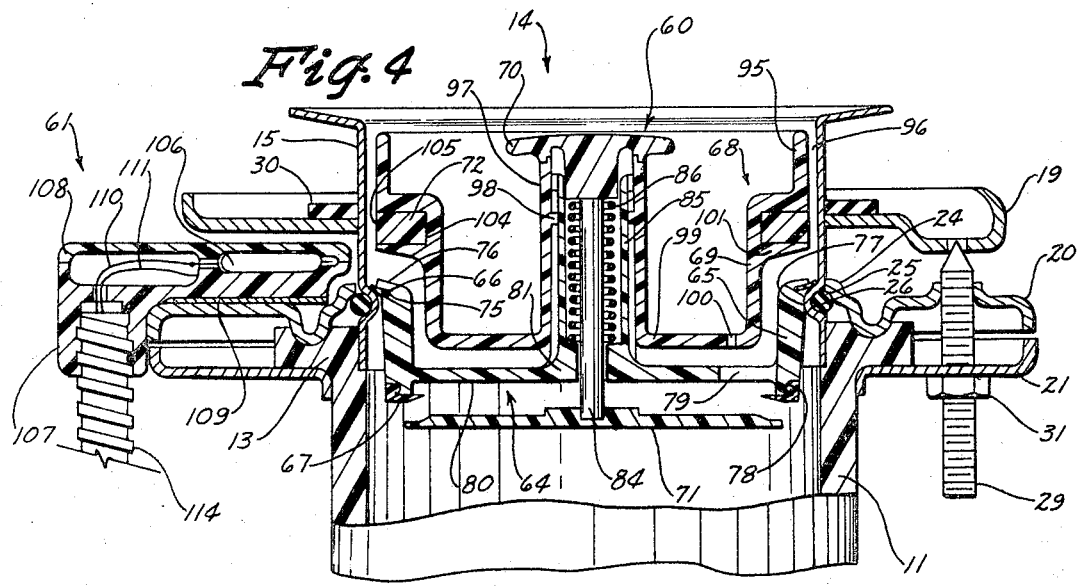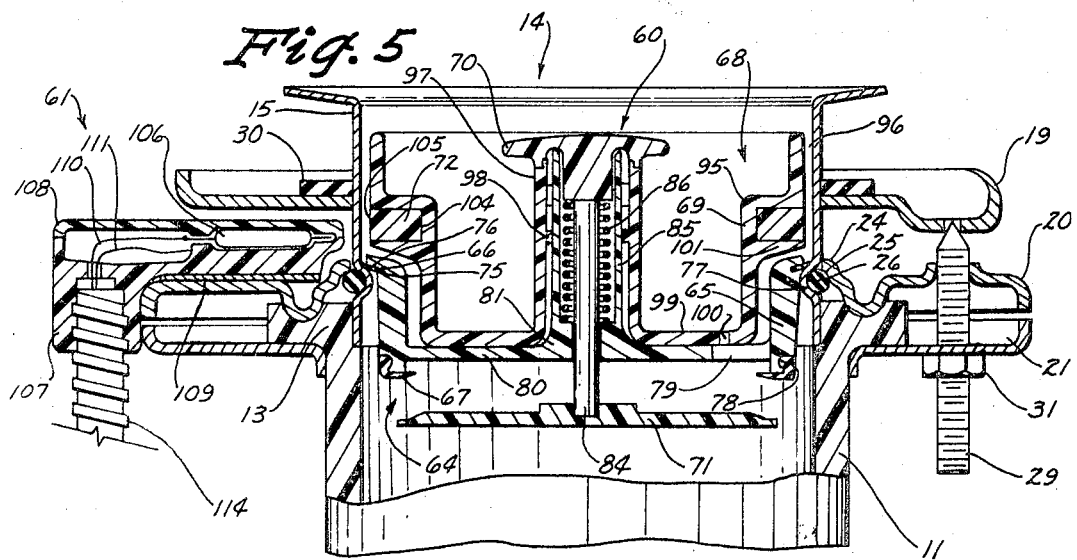

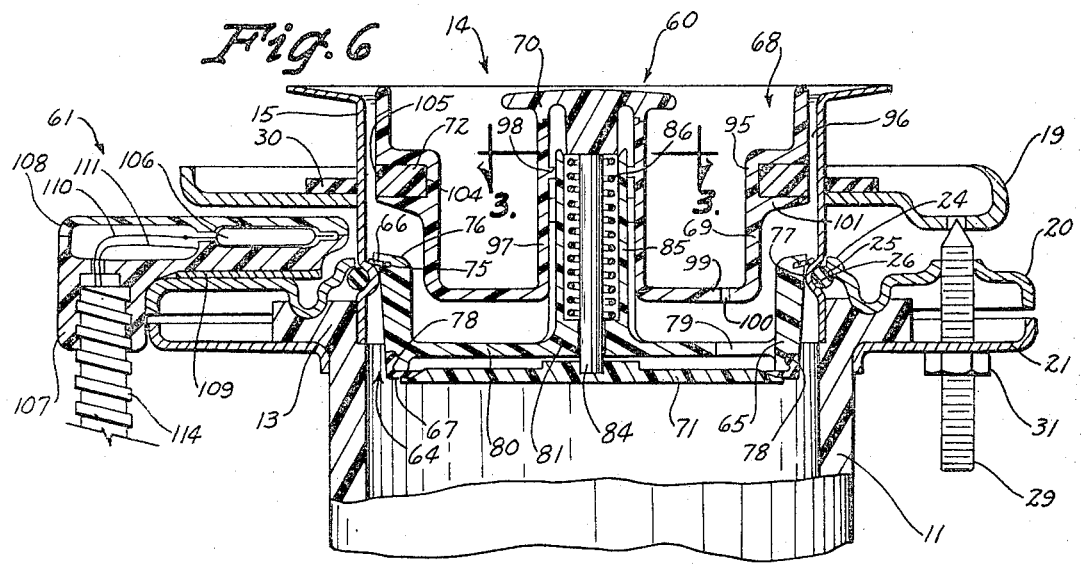

United States Patent Office 3,430,871
Patented Mar. 4, 1969

3,430,871
CONTROL FOR WASTE DISPOSER APPARATUS
Frank E. Ross, Newton, Iowa, assignor to The Maytag Company, Newton, Iowa, a corporation of Delaware
Filed Dec. 27, 1966, Ser. No. 604,914
U.S. Cl. 241—32.5     13 Claims
Int. Cl. B02c 19/12, 25/00, 19/00

ABSTRACT OF THE DISCLOSURE

A control system for a waste disposer apparatus including an inlet cover construction having a movable fluid container for receiving fluids and retaining a portion thereof to sense a minimum rate of fluid flow into the disposer apparatus. Actuation means, movable with the fluid container, is operable for initiating motor operation responsive to a predetermined minimum rate of fluid flow.

BACKGROUND OF THE INVENTION

Field of the invention

This invention relates to waste disposer apparatus and more particularly to a control system for insuring the presence of sufficient fluid flow during operation of the waste disposer.

Description of the prior art

Prior art patents disclose waste disposers having means for relating motor operation to the presence of fluid. The majority of these waste disposers include actuation of a pressure sensitive switch means responsive to back pressure in the fluid inlet line or to a pressure head of a diverted portion of the incoming fluid. In addition, a portion of these waste disposers include a separate "on-off" switch operated by rotating the lid or inlet cover.

SUMMARY OF INVENTION

The waste disposer of the instant invention provides an improved inlet and inlet cover construction in which a fluid container positioned in the inlet is operable for receiving fluid and for accumulating and maintaining a predetermined quantity of fluid in the container when there is a desired fluid flow into the disposer. Actuation means, associated with the fluid container, is movable relative to the inlet responsive to the predetermined quantity for energizing the motor.

It is an object of the present invention to provide a waste disposer apparatus having an improved inlet and inlet cover construction capable of measuring fluid flow into the disposer apparatus and for operating said disposer apparatus responsive to a predetermined minimum fluid flow.

It is a further object of the present invention to provide a waste disposer apparatus having an improved inlet and inlet cover construction that combines the fluid flow sensing function and the operator controlled "on-off" function.

Operation of the device and further objects and advantages thereof will become evident as the description proceeds and from an examination of the accompanying three pages of drawings which illustrate a preferred embodiment of the invention and in which similar numerals refer to similar parts throughout the several views.

BRIEF DESCRIPTION OF THE DRAWINGS

FIGURE 1 is an over-all side view of a waste disposer apparatus shown partially in vertical section to illustrate the instant invention;

FIGURE 2 is a fragmentary horizontal sectional view showing details of the disposer apparatus control system as taken along section line 2—2 of FIGURE 1;

FIGURE 3 is a horizontal sectional view of the center portion of the inlet cover assembly as taken along section line 3—3 of FIGURE 6;

FIGURE 4 is an enlarged sectional view of the inlet portion of the disposer apparatus showing the instant invention in greater detail;

FIGURE 5 is a view similar to FIGURE 4 and further showing the inlet cover assembly in the actuating position;

FIGURE 6 is a sectional view of the inlet similar to that of FIGURES 4 and 5 and showing the valve portion of the inlet cover assembly in a sealing position for closing the fluid ingress into said disposer apparatus; and FIGURE 7 is an electrical schematic circuit of the control system of the instant invention.

DESCRIPTION OF THE PREFERRED EMBODIMENT

Referring to FIGURE 1, there is shown a generally cylindrical waste disposer apparatus including an upper housing 11 defining a comminution chamber 12 for accommodating waste material to be comminuted and further including an inlet 14 at its upper end for receiving the waste material. The inlet 14 includes a flanged inlet sleeve member 15 supportable in a drain opening of a sink (not shown) or the like. The inlet sleeve member 15 is connected to the flanged inlet end 13 of the upper housing 11 through a supporting arrangement, indicated generally by the arrow 16, and which includes upper and lower mounting plates 19 and 20 and housing clamping plate 21.

The inner flange portion 24 of the lower mounting plate 20 is supported on a retaining ring 25 carried by an inwardly extending recess 26 formed in the flanged inlet sleeve 15. A plurality of mounting studs 29 are threadingly engageable with the lower mounting plate 20 and extend upwardly therethrough to bear against the upper mounting plate 19 which in turn bears against the lower side of a supporting sink flange (not shown) through a resilient sink gasket 30. The mounting studs 29 further carry a clamping nut 31 engageable with the lower surface of the housing clamping plate 21. Tightening of the studs 29 separates the upper mounting plate 19 from the lower mounting plate 20. Tightening of the clamping nuts 31 on mounting studs 29 clamps the flanged inlet end 13 of the upper housing 11 between the lower mounting plate 20 and the housing clamping plate 21 to effect a connection of the disposer to the sink through the flanged inlet sleeve 15.

A lower housing 35 defines a discharge chamber 36 communicating with a fluid outlet 39. The lower housing 35 is attached to the upper housing 11 through a housing clamp 38 encompassing the lower portion of the upper housing 11 and having flange 40 mating with a flange 41 of lower housing 35. A plurality of bolts 44 join the mating flanges 40, 41.

A substantially cylindrical shredder ring 45 is maintained in a relatively stationary position through the clamping action of the housing clamp 38 and the lower housing 35. The shredder ring 45 includes a plurality of inwardly extending shredding elements 46 disposed around the inner periphery of the shredder ring. Between each of the inwardly extending elements 46 is a longitudinally extending channel 47 for accommodating flow of fluid and comminuted waste material from the comminuting chamber 12 toward the discharge chamber 36 and the outlet 39. The shredder ring 45 engages and compresses a sealing flange 50 at the lower end of the upper housing 11 and a sealing gasket 51 recessed into the upper flange 41 of the lower housing 35 to seal the comminuting chamber 12 and discharge chamber 36 from leakage through the connection at the mating flanges 40, 41 of the housing clamp 38 and the lower housing 35. A fluid seal is provided at the upper end of the housing 11 by the juncture of the lower end of the inlet sleeve 15 and the upper inner shoulder of the inlet end 13 of the housing 11.

A rotary impeller assembly 54 includes a rotor 55 attached to the motor shaft (not shown) for rotation therewith. The rotor 55 supports at least one impeller 56 that is cooperable with the inwardly extending elements 46 of the shredder ring 45 for effecting comminution of the waste material upon operation of the motor.

Attached to the lower portion of the lower housing 35 is a motor 59 for rotating the rotary impeller assembly 54 to effect comminution of the waste material between the impellers 56 and the shredder ring 45.

Disposed within the inlet sleeve 15 is a combination inlet cover and disposer control assembly indicated generally by the arrow 60. This cover and control assembly 60 is effective as a stopper for the disposer apparatus, and as a fluid flow responsive motor control means as will be more fully described hereinafter. Supported adjacent to the exterior of the inlet sleeve 15 of the disposer apparatus is means, indicated generally by arrow 61, for controlling energization of the motor 59 responsive to operation of the cover and control assembly 60 as will also be more fully described hereinafter.

Referring to the cover and control assembly 60 as best shown in FIGURES 4 through 6, it is seen that the cover and control assembly 60 is insertable into and supportable within the inlet sleeve 15, and includes a supporting portion 64 comprising a body member 65 and two sealing members 66, 67 and further includes a movably supported portion 68 comprising fluid container 69, knob 70, valve member 71 and actuator member 72.

The body member 65 includes a peripheral recess 75 adjacent a flange 76 of its upper edge. The annular seal member 66 is retained in the recess 75 and cooperates with the upper flange 76 for supporting the cover and control assembly 60 in the inlet 15 at the inwardly extending ring 77 formed by the inwardly extending recess 26. The upper seal 66 seals against the ring 77 to prevent fluid flow around the body member 65.

The body member 65 further includes a second peripheral recess 78 at its lower edge for receiving the lower seal member 67 that extends inwardly over the lower edge of the body member 65.

At least one opening 79 is formed in the bottom wall 80 of the body member 65 to define a fluid ingress into said disposer apparatus. The fluid entering the disposer passes through the fluid ingress.

The body member 65 includes a centrally located hub 81 for receiving a shaft 84 and further includes a cylindrical wall 85 extending upwardly from the hub 81. The cylindrical wall forms a supporting post for the movably supported portion 68 and also forms a sleeve for housing a biasing spring 86 as will be more fully explained hereinafter. As best shown in FIGURE 3, a pair of axially oriented recesses 87 are formed on the outside of the cylindrical wall 85 to serve as a vertical guide for the movably supported portion 68. Adjacent to each of the recesses is a circumferential ramp 88 including a first flat 89 at a first vertical position adjacent the upper end of each of the recesses and a second flat 90 at a second higher vertical position. An inclined portion 91 joins the first and second flats. A stop 94 extends outwardly from the cylindrical wall 85 at a position adjacent to the second higher flat 90.

As previously indicated, a movably supported portion 68 is associated with the supporting portion 64 to form the inlet cover and control assembly 60. Included in the movably supported portion 68 is a fluid container or cup member 69 having an imperforate outer wall 95 that is spaced from the inlet sleeve 15 to form an annular fluid passageway 96 therebetween yet positioned close enough to the inlet sleeve 15 to receive at least a portion of the fluid entering the disposer.

An imperforate center wall 97 of the fluid container 69 forms a cylinder that telescopes over the center post formed by the cylindrical wall 85 of body member 65. An inwardly extending lug or projection 98 is formed on the radially inward side of the center wall 97 engageable with the axial recess 87 to permit and guide axial movement of the fluid container 69. The projection 98 is engageable with the circumferential ramp 88 to raise the container 69 upon rotation of the projection 98 out of the recess 87. The stop 94 limits rotation of the container 69 relative to the body member 65.

The bottom wall 99 of the fluid container 69 is substantially imperforate except for at least one orifice 100 for effecting a predetermined rate of fluid egress from the container to maintain the fluid container 69 full only when the fluid flow into the disposer is at least as great as the desired minimum.

A knob member 70 is attached to and closes the top of the cylindrical wall 97 of the container 69. The knob 70 is manually engageable to relocate the container 69 or to move the entire inlet cover and control assembly 60.

Disposed within the center post formed by cylindrical wall 85 and operating between the movable portion 68 and the supporting portion 64 of the inlet cover and control assembly 60 is a biasing member in the form of a coil spring 86. The biasing member 86 is operable for positioning the movable portion 68 to a normal vertical position as shown in FIGURE 4 when the fluid container 69 is empty. The weight of the container when filled with water overcomes the spring 86 and moves the movable portion 68 to an operating position as shown in FIGURE 5. In this position, disposer operation is initiated as will be more fully explained hereinafter.

An alternate form of the biasing means 86 would include use of a pair of magnets attached to the fluid container and body member so that their magnetic fields were in opposition or repelled each other.

Valve member 71 is attached to the fluid container 69 through shaft member 84 extending upwardly from the valve member 71 and passing through the hub 81 and spring 86 to the knob 70. The valve member 71 is movable with the knob 70 and fluid container 69 and is engageable with the lower seal 67 upon movement of the fluid container 69 to the upper position as shown in FIGURE 6. The fluid container 69 and valve member 71 may be moved to and locked or retained in this position by raising the container 69 and knob 70 to move the projection 98 out of the recess 87 and then rotating the container 69 and knob 70 clockwise as in FIGURE 3 to move the projection 98 up the ramp 88 to the flat 90 at the elevated level. The sink drain is effectively closed and thus water may be retained in the sink.

The lower portion of the outer wall 95 of the movable fluid container 69 is offset radially inwardly to receive an annular actuation member in the form of an annular or ring magnet 72. The actuation means is given annular form to eliminate the need for angular prepositioning or orientation and manipulation of the inlet cover and control assembly 60. The ring magnet 72 is retained by the outwardly extending annular flange 101.

The ring magnet 72 may be formed of magnetizable plastic materials, ceramics, or metals. The magnetic material for use with the instant invention is magnetized so that the ring magnet, as used in FIGURE 4, includes a first magnetic pole of the inner periphery 104 of the ring magnet and a second magnetic pole at the outer periphery 105 thereof. This ring magnet 72 is operable for actuating a reed switch 106 as will be more fully shown hereinafter.

Use of a ring magnet for actuating a disposer apparatus is also disclosed in an earlier filed copending application assigned to the assignee of the instant application.

The actuator member 72 is normally positioned in a non-actuating position as in FIGURE 4 when less than the minimum fluid is flowing but is movable to an actuating position as shown in FIGURE 5 when the fluid container member is full. The actuator is prevented from movement when the container 69 and valve 71 are moved to the closed position as in FIGURE 6.

Referring again to the electrical portion of the control system of the instant invention, a reed switch 106 is positioned adjacent the outer periphery of the inlet sleeve 15 by means 61 including a lower switch housing portion 107 and a cover portion 108. The switch housing portion 107 is supported by a housing retainer 109 that is in turn welded to the lower mounting plate 20.

The reed switch 106 is located at a predetermined vertical position adjacent the inlet sleeve 15 so as to be positioned adjacent the horizontal plane substantially bisecting the ring magnet 72 when the inlet cover and control assembly 60 is in the operating position as shown in FIGURE 5. At this horizontal plane, a portion of the lines of magnetic force extending between the inner and outer magnetic poles are concentrated and tend to radiate in a substantially outward direction along this plane to pass longitudinally through the reed switch 106 and effect actuation thereof. It will be noted that this magnetic field is present around the entire ring magnet 72 and thus the ring magnet is operable for actuating the reed switch 106 regardless of the angular orientation of the inlet cover and control assembly 60. It will also be noted that with the inlet cover and control assembly 60 positioned as in FIGURES 4 and 6, the ring magnet 72 is above the reed switch 106 so that actuation of the reed switch 106 is prevented and the disposer apparatus drive motor 59 is maintained de-energized.

The reed switch 106 is connected into the control circuit by a pair of wires 110 and 111 which extend from the reed switch 106 through a flexible conduit 114 to other elements of the control circuit as will be shown hereinafter.

The control circuit is shown schematically in FIGURE 7 and includes a plurality of control and operating elements connected between power lines $L_1$ and $L_2$. The reed switch 106 is connected in series with a relay coil 115 that is energizable in response to completion of a circuit through the reed switch 106 for operating a line switch 116 to the closed condition and thereby completing an energizing circuit to the drive motor 59. The drive motor 59 includes the start winding 117 and the run winding 118 and further includes a starting relay coil 119 and capacitor 120. After completion of a circuit through the reed switch 106 and operation of the line switch 116 to the closed position, the run winding 118 is energized and then start winding 117 is energized through switch 121 for accelerating the motor 59 to operating speed. Upon encountering a decrease in current to run winding 118 the starting relay coil 119 is de-energized to open the start winding switch 121 and remove the start winding 117 from the circuit. Operation of the run winding 118 continues under control of the thermal protector 124 which is operable to an open position upon encountering an overload condition.

The instant invention may be more clearly seen by reviewing the operation of the disposer shown in the attached drawings. The invention is applied to a batch-type disposer and thus the first step in its operation is to remove the inlet cover and control assembly 60 and insert the waste material into the comminuting chamber through the inlet 14. The inlet cover and control assembly 60 is inserted into the inlet 14 in a position as shown in FIGURE 4 and the water is turned on. Upon becoming filled with water by virtue of a water flow in excess of a predetermined amount, the fluid container 69 and ring magnet 72 move to the position shown in FIGURE 5 to actuate the reed switch 106 to a closed position for energizing the drive motor 59. Operation of the device will continue until the inlet cover and control assembly 60 is moved from the position shown in FIGURE 5 or until fluid flow into the container decreases to a rate which is insufficient to maintain the fluid container full.

If the operator desires to use the sink, to which the disposer is attached, without operating the disposer, the fluid container 69 and knob 70 may be raised to move projection 98 out of recess 87 and then rotated to move projection 98 up ramp 88 to the flat 90 for closing the ingress and locking the ring magnet 72 in a non-actuating position as shown in FIGURE 6. The sink may then be filled with fluid.

Fluid may then be drained from the sink by removing the inlet cover and control assembly 60 or by locating the projection 98 on the lower flat 89 out of alignment with the recess 84. Fluid flow is then permitted through the fluid ingress opening 79 while the fluid container 69 is prevented from lowering to the actuating position so that disposer apparatus is maintained de-energized.

It is thereby seen that the instant invention provides an improved control system having an inlet cover and control assembly 60 which insures the presence of sufficient fluid flow during operation. This inlet cover and control assembly 60 allows operation of the device upon insertion into the inlet in any of an infinite multiplicity of angular positions.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention as further defined in the following claims.

I claim:
1. A waste disposer apparatus having an inlet for receiving waste materials and fluid, a housing providing a comminution chamber, comminution means for comminuting waste material within said chamber, drive means for operating said comminution means to effect said comminution of waste material, and circuit means for effecting selective energization of said drive means, wherein the improvement comprises: fluid container means supportable in said inlet for receiving at least a portion of the fluid flowing into said disposer apparatus and accumulating said fluid when the rate of fluid flow into said chamber exceeds a predetermined minimum; and actuation means associated with said fluid container means and movable relative to said inlet, said actuation means having a first position relative to said inlet and being movable from said first position to a second position responsive to accumulation of a predetermined quantity of fluid in said container, said circuit means being responsive to movement of said actuation means to said second position for energizing said drive means.

2. A waste disposer apparatus as defined in claim 1 wherein said circuit means includes a switch member and wherein said actuation means is annular in form and carried by said fluid container means for actuation of said switch member.

3. A waste disposer apparatus having an inlet for receiving waste material and fluid, a housing providing a comminution chamber, comminution means for comminuting waste materials within said chamber, drive means for operating said comminution means to effect said comminution of waste material, and circuit means for effecting selective energization of said drive means, wherein the improvement comprises: fluid container means movably supportable in said inlet for receiving at least a portion of the fluid flowing into said disposer apparatus and accumulating said fluid when the rate of fluid into said chamber exceeds a predetermined minimum; means for biasing said fluid container means to a first position, said fluid container means being movable from said first position to a second position responsive to accumulation of a predetermined quantity of fluid in said container; and actuation means for actuating said circuit means and energizing said drive means responsive to movement of said fluid container means to said second position.

4. A waste disposer apparatus as defined in claim 3 wherein said fluid container means defines a fluid egress for draining fluid from said fluid container means at a predetermined rate.

5. A waste disposer apparatus as defined in claim 3 wherein said actuation means is supported by and movable with said fluid container means.

6. A waste disposer apparatus as defined in claim 3 wherein said circuit means includes a reed switch and wherein said actuation means is in the form of a ring magnet carried by said fluid container means for actuation of said reed switch.

7. A waste disposer apparatus as defined in claim 4 wherein said actuation means is annular and carried by said fluid container means.

8. A waste disposer apparatus as defined in claim 7 wherein said fluid container means is lockable in a third position to prevent actuation of said circuit means while permitting passage of fluid into said chamber.

9. A waste disposer apparatus having an inlet for receiving waste materials and fluid, a housing providing a comminution chamber, comminution means for comminuting waste materials within said chamber, a first inlet cover portion engageable with said inlet and defining a fluid ingress into said chamber, drive means for operating said comminution means to effect said comminution of waste material, and circuit means for effecting selective energization of said drive means, wherein the improvement comprises: a second inlet cover portion including a fluid container movably supported in said inlet by said first inlet cover portion for receiving at least part of the fluid entering said inlet and defining fluid egress means for draining fluid from said fluid container at a predetermined rate; means for biasing said fluid container to a first position, said fluid container being movable from said first position to a second position with a predetermined quantity of accumulated fluid; and actuation means responsive to movement of said fluid container to said second position for actuating said circuit means and energizing said drive means.

10. A waste disposer apparatus as defined in claim 9 wherein said biasing means is operably disposed between said first inlet cover portion and said fluid container.

11. A waste disposer apparatus as defined in claim 9 wherein said circuit means includes a reed switch and wherein said actuation means is in the form of a ring magnet carried by said fluid container for actuating said reed switch.

12. A waste disposer apparatus as defined in claim 9 wherein said fluid container is lockable in a third position to prevent actuation of said circuit means while permitting passage of fluid into said chamber.

13. A waste disposer apparatus as defined in claim 12 and further including valve means operable for closing said fluid ingress and wherein said fluid container is movable to a fourth position upon operation of said valve for closing said fluid ingress to prevent actuation of said circuit means and to prevent fluid flow into said disposer.

References Cited
UNITED STATES PATENTS

| | | | |
|---|---|---|---|
| 2,185,037 | 12/1939 | Powers | 241—32.5 |
| 2,244,402 | 6/1941 | Powers | 241—32.5 |
| 2,484,459 | 10/1949 | Osborn | 241—32.5 |
| 2,518,176 | 8/1950 | Powers | 241—32.5 X |
| 2,619,654 | 12/1952 | Coss | 241—32.5 |
| 2,657,397 | 11/1953 | Drew | 241—32.5 |
| 2,753,121 | 7/1956 | Elfenbein | 241—32.5 |
| 2,877,955 | 3/1959 | Bebinger | 241—32.5 |
| 3,154,256 | 10/1964 | Bebinger | 241—46 |
| 3,335,969 | 8/1967 | Egle | 241—46 |

HARRISON L. HINSON, *Primary Examiner.*

U.S. Cl. X.R.

241—46, 100.5, 257